United States Patent Office 3,657,219
Patented Apr. 18, 1972

3,657,219
PROCESS FOR THE PREPARATION OF A DIAZO PIGMENT FROM A DIAZOAMINO COMPOUND
Karl Ronco and Willy Mueller, Riehen, Switzerland, assignors to Ciba-Limited, Basel, Switzerland
No Drawing. Filed Sept. 26, 1967, Ser. No. 670,760
Claims priority, application Switzerland, Oct. 5, 1966, 14,364/66
Int. Cl. C09b 27/00
U.S. Cl. 260—176
4 Claims

ABSTRACT OF THE DISCLOSURE

An improved process for the manufacture of a disazo pigment of the formula

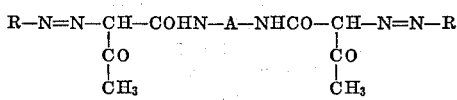

in which A represents an arylene radical and R represents an aryl radical, wherein a diazoamino compound of an arylamine is heated with a bisacetoacetyl-arylenediamine in an organic solvent.

---

German specification No. 1,150,165 describes a process for the manufacture of yellow disazo pigments by condensing a dihalide of a dicarboxylic acid of the formula (1)

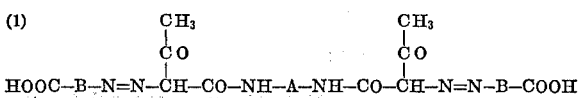

in which A and B represent aryl radicals, with 2 mols of a primary monamine. While this process furnishes products having excellent pigment properties, it has the disadvantage that it must be carried out in an anhydrous organic solvent and that the formation of the dicarboxylic acid halide and the condensation with the monoamine require two separate process steps.

The present invention is based on the observation that the desired disazo pigments can be obtained in an excellent yield and in a form well suited for pigment purposes by coupling the diazoamino compound of a diazotized arylamine with a bisacetoacetyl compound of the formula (2) $CH_3$—CO—$CH_2$—CO—HN—
$\quad\quad\quad\quad\quad$A—NH—CO—$CH_2$—CO—$CH_3$ in an organic solvent, or if desired in an aqueous organic solution, preferably in the presence of an acid, whereby the diazoamino compound is thermally split and coupling takes place instantaneously.

The diazoamino compound used is preferably one of the formula (3)

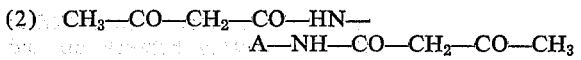

In these diazo components of the Formula 3 to be used in the present process R represents preferably an unsubstituted or substituted benzene residue, $R_1$ and $R_2$ an organic radical each. Of special value are diazoamino compounds of amines of the formula

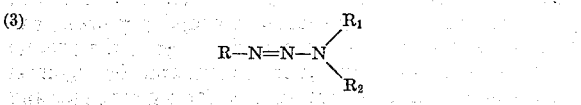

in which $V_1$ represents a hydrogen or halogen atom, or an alkyl, alkoxy or carbalkoxy group, $V_2$ a hydrogen or halogen atom, X, Y and Z each a hydrogen or halogen atom, or an alkyl, alkoxy, a possibly substituted phenoxy, nitro, trifluoromethyl, cyano or carbalkoxy group; also amines of the formula

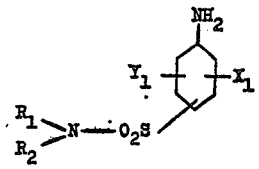

in which $X_1$ and $Y_1$ each represents a hydrogen or halogen atom or an alkyl or alkoxy group, $R_1$ a hydrogen atom or an alkyl group, and $R_2$ represents a hydrogen atom or an alkyl or aryl residue.

As examples of the compounds of the Formula 4 the following aminocarboxylic acid arylides may be mentioned:

3-aminobenzoic acid anilide,
4-aminobenzoic acid anilide,
4-chloro-3-aminobenzoic acid anilide,
4-chloro-3-aminobenzoic acid-3'-chloranilide,
4-chloro-3-aminobenzoic acid-2'-methyl-3'-chloranilide,
4-chloro-3-aminobenzoic acid-2'-methyl-5'-chloranilide,
4-chloro-3-aminobenzoic acid-3'-trifluoromethylanilide,
4-chloro-3-aminobenzoic acid-2'-chloro-5'-trifluoromethylanilide,
4-chloro-3-aminobenzoic acid-3',5'-di-triflfluoromethylanilide,
4-chloro-3-aminobenzoic acid-2',4',5'-trichloranilide,
4-chloro-3-aminobenzoic acid-2',4'-dichloranilide,
4-chloro-3-aminobenzoic acid-2',5'-dichloranilide,
2,4-dichloro-3-aminobenzoic acid-3'-trifluoromethylanilide,
2,4-dichloro-5-aminobenzoic acid-2',4',5'-trichloranilide,
2,4-dichloro-5-aminobenzoic acid-2'-chloro-5'-trifluoromethylanilide,
4-methoxy-2-chloro-5-aminobenzoic acid-3'-trifluoromethylanilide,
4-chloro-3-aminobenzoic acid-2'-phenoxy-5'-trifluoromethylanilide,
4-chloro-3-aminobenzoic acid-2'(4"-chlorophenoxy)-5'-trifluoromethylanilide,
4-chloro-3-aminobenzoic acid-2'-(2",4",5"-trichlorophenoxy)-5'-trifluoromethylanilide,
4-chloro-3-aminobenzoic acid-2'-(4"-methylphenoxy)-5'-trifluoromethylanilide,
4-chloro-3-aminobenzoic acid-2'-(4"-methoxyphenoxy)-5'-trifluoromethylanilide.

As examples of compounds of the Formula 5 there may be mentioned:

3-amino-4-chlorobenzene-sulphonic acid anilide,
3-amino-4-chlorobenzenesulphonic acid-2',4'dichloranilide,
3-amino-4-methylbenzenesulfonic acid anilide,
3-amino-4-methylbenzenesulphonic acid-3'-trifluoromethylanilide,
3-amino-4-methoxybenzenesulphonic acid anilide,
3-amino-4-methoxybenzenesulphonic acid-2',5'-dichloranilide,

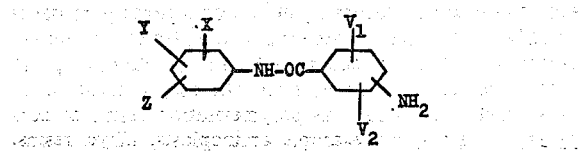

2,5-dimethoxy-4-aminobenzenesulphonic acid anilide,
2,5-dimethoxy-4-aminobenzenesulphonic acid-2'-chloranilide,
2,5-dimethoxy-4-aminobenzenesulphonic acid-2',4'-dichloranilide,
2,5-dimethoxy-4-aminobenzenesulphonic acid-2',5'-dichloranilide,
2,5-dimethoxy-4-aminobenzenesulphonic acid-2',4',5'-trichloranilide,
2-methoxy-5-methyl-4-aminobenzenesulphonic acid anilide,
2,5-dimethyl-4-aminobenzenesulphonic acid anilide,
4-methoxy-3-aminobenzenesulphonic acid amide,
4-methoxy-3-aminobenzenesulphonic acid dimethylamide,
4-methoxy-3-aminobenzenesulphonic acid ethylamide.

The aryldiazoamides to be used in the present process are obtained in the known manner by coupling an aryldiazonium salt with a primary or preferably a secondary amine. For this purpose a wide variety of amines are suitable, for example, aliphatic amines such, for example, as methylamine, ethylamine, ethanolamine, propylamine, isopropylamine, butylamine, hexylamine and especially dimethylamine, diethylamine, methylethanolamine, dipropylamine or dibutylamine, aminoacetic acid, N-methyl-aminoacetic acid, butylaminoacetic acid, aminoethanesulphonic acid, N-methylaminoethanesulphonic acid, guanylethanesulphonic acid, β-aminoethyl-sulphuric acid; alicyclic amines such, for example, as cyclohexylamine, N-methyl-cyclohexylamine, dicyclohexylamine; aromatic amines such for example, as 4 - aminobenzoic acid, sulphanilic acid, 4 - sulpho - 2 - aminobenzoic acid, 4 - sulphophenylguanidine, 4 - N-methylaminobenzoic acid, 4-N-ethylaminobenzoic acid, 1 - amino-naphthalene-4-sulphonic acid, 1 - aminonaphthalene-2,4-disulphonic acid; heterocyclic amines such, for example, as piperidine, morpholine, pyrrolidine, and finally also sodium cyanimed or dicyandiamide. The amines may be further described as

wherein $R_4$ is hydrogen or lower alkyl and $R_5$ is lower alkyl, hydroxyethyl, carboxymethyl, (sulfonic acid)ethyl, carboxyphenyl, sulfophenyl, sulfo-carboxyphenyl, sulfophenylformamidino, sulfonaphthyl or cyanoformamidino or $R_4$ and $R_5$ are each cyclohexyl and $R_4$ and $R_5$ together with the nitrogen atoms form a piperidine, morpholine or pyrrolidine ring.

As a rule, the diazoamine compounds obtained are sparingly soluble in cold water and can be isolated from the reaction media in crystalline form by salting out. In many cases the moist press cakes, as they result from the manufacture, may be used directly for the further reaction. In some cases it may prove advantageous to dehydrate the diazoamides by vacuum drying before the reaction or to suspend them in an organic solvent and then to remove the water by azeotropic distillation.

The bisacetoacetyl compounds of the Formula 2 to be used as coupling components contain as the arylene radical preferably one of the formula

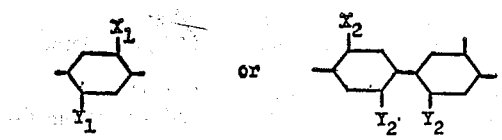

in which $X_1$ and $X_2$ each represents a hydrogen or halogen atom or an alkyl or alkoxy group, $Y_1$ a hydrogen or halogen atom or an alkyl, alkoxy or trifluoromethyl group, and $Y_2$ represents a hydrogen or halogen atom.

These compounds are obtained by simply reacting an acetoacetic acid ester or diketene upon an aromatic diamine such, for example, as 1,4-diaminobenzene,
1,3-diaminobenzene,
1,3-diamino-4-methoxybenzene,
1,3-diamino-4-methylbenzene,
1,3-diamino-4-chloorbenzene,
1,4-diamino-2-chlorobenzene,
1,4-diamino-2-bromobenzene,
1,4-diamino-2,5-dichlorobenzene,
1,4-diamino-2-chloro-5-methylbenzene,
1,4-diamino-2-chloro-5-methoxybenzene,
1,4-diamino-2-methylbenzene,
1,4-diamino-2,5-dimethylbenzene,
1,4-diamino-2-methyl-5-methoxybenzene,
1,4-diamino-2-methoxybenzene,
1,4-diamino-2,5-dimethoxybenzene,
1,4-diamino-2,5-diethoxybenzene,
1,3-diamino-4,6-dimethylbenzene,
1,3-diamino-2,6-dimethylbenzene,
4,4'-diaminodiphenyl,
3,3'-dichloro-4,4'-diaminophenyl,
3,3'-dimethyl-4,4'-diaminodiphenyl,
3,3'-dimethoxy-4,4'-diaminodiphenyl,
3,3',6,6'-tetrachloro-4,4'-diaminodiphenyl,
3,3'-dimethyl-6,6'-dichloro-4,4'-diaminodiphenyl,
1,5-diaminonaphthalene,
2,6-diaminonaphthalene,
1,4-diaminonaphthalene,
2,8-diaminochrysene,
4,11-diaminofluoranthene.

The coupling of the diazoamino compound with the bis-acetoacetylamino compound is carried out in an organic solvent, for example in chlorobenzene, o-dichlorobenzene, nitrobenzene, pyridine, quinoline, ethyleneglycol, ethyleneglycol monomethyl or monoethyl ether, dimethylformamide, N-methylpyrrolidone, formic acid or preferably in acetic acid.

In general, it is not necessary to use the diazoamino compound in the anhydrous form. It is possible to use, for example, the suction filter cake still moist with water. The splitting of the diazoamino compound preceding the coupling is preferably carried out in an acidic medium. When a neutral solvent is used, an acid, for example hydrochloric, sulphuric, formic or acetic acid, must be added.

The coupling reaction is advantageously conducted at an elevated temperature, preferably between 60 and 180° C. and in general it proceeds rapidly and quantitatively.

By virtue of their insolubility the resulting pigments can be filtered off from the reaction mixture. Since the by-products remain dissolved, the resulting pigments are obtained in an excellent purity so that in most cases an after-treatment with an organic solvent, as is needed with pigments obtained by the aqueous coupling process, can be dispensed with. It is another advantage of the process of this invention that the yield is high, and the pigments are obtained in a form very suitable for pigment uses and the tinctorial properties are constant.

The pigments obtained by the present process may be used for a wide variety of pigment applications because of their favourable properties, for example in a finely dispersed form for dyeing rayon and viscose or cellulose ethers or esters or superpolyamides or superpolyurethanes or polyesters in the spinning mass, and also for the manufacture of coloured lacquers and lakes, solutions or products from acetylcellulose, nitrocellulose, natural resins or synthetic resins such as polymerisation resins or condensation resins, for example aminoplasts, alkyd resins, phenoplasts, polyolefines such, for example, as polystyrene, polyvinylchloride, polyethylene, polypropylene, polyacrylonitrile, rubber, casein, silicone and silicone resins. Furthermore, they may be used advantageously in the manufacture of colour pencils, cosmetics or laminated panels.

The following examples illustrate the invention. Unless otherwise indicated, parts and percentages are by weight.

EXAMPLE 1

82 parts of the diazoamino compound of the formula

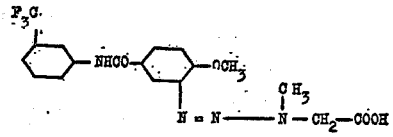

[obtained by coupling diazotized 4-methoxy-3-aminobenzoic acid-(3'-trifluoromethyl) anilide with sarcosine in an alkaline medium] and 30.5 parts of 2,5-bisacetoacetylamino-1, 4-dimethylbenzene are stirred in 1600 parts of glacial acetic acid for 90 minutes at 110 to 115° C. The deep yellow pigment is filtered off hot and washed with hot glacial acetic acid, methanol and water, to yield 81 parts (=85.6% of theory) of the dyestuff of the formula

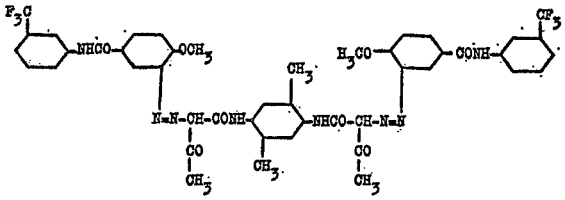

in the form of a yellow pigment which is sparingly soluble to insoluble in the conventional solvents and produces on polyvinylchloride yellow tints of excellent fastness to migration, overlacquering and light.

The following table lists a number of further pigments obtained by coupling the diazoamino compounds formed from the diazo compounds of the aminobenzenes in Column I and the stabilizers shown in Column II with the bisacetoaceyl compounds of the diamines listed in Column III as described in this example. Column IV shows the colour of a polyvinylchloride foil manufactured with the pigment concerned.

| No. | I | II | III | IV |
|---|---|---|---|---|
| 1 | 4-chloro-3-aminobenzoic acid-2',5'-dichloroanilide | Methyltaurine | 2,5-dichloro-1,4-phenylenediamine | Greenish yellow. |
| 2 | do | Diethylamine | 2-chloro-1,4-phenylenediamine | Do. |
| 3 | 4-chloro-3-aminobenzoic acid-3'-chloro-2'-methylanilide | Methyltaurine | 1,4-phenylenediamine | Do. |
| 4 | do | do | 2,5-dichloro-1,4-phenylenediamine | Do. |
| 5 | do | do | 2-chloro-5-methyl-1,4-phenylenediamine | Yellow. |
| 6 | do | do | 2-chloro-5-methoxy-1,4-phenylenediamine | Reddish yellow. |
| 7 | do | Piperidine | 2,5-dimethyl-1,4-phenylenediamine | Do. |
| 8 | 4-chloro-3-aminobenzoic acid-5'-chloro-2'-methylanilide | Morpholine | 2-chloro-5-methyl-1,4-phenylenediamine | Greenish yellow. |
| 9 | do | do | 2-chloro-5-methoxy-1,4-phenylenediamine | Do. |
| 10 | do | do | 2,5-dimethoxy-1,4-phenylenediamine | Reddish yellow. |
| 11 | 4-chloro-3-aminobenzoic acid-3'-trifluoromethylanilide | do | 2,5-dichloro-1,4-phenylenediamine | Greenish yellow. |
| 12 | do | do | 2-chloro-5-methyl-1,4-phenylenediamine | Do. |
| 13 | 4-chloro-3-aminobenzoic acid-2'-chloro-5'-trifluoromethylanilide | Diethylamine | do | Do. |
| 14 | do | do | do | Yellow. |
| 15 | do | do | 2,5-diethoxy-1,4-phenylenediamine | Yellow-orange. |
| 16 | do | do | 2,4-dimethyl-1,5-phenylenediamine | Yellow. |
| 17 | do | do | 3,3'-dimethyl-4,4'diaminodiphenyl | Do. |
| 18 | do | Methyltaurine | 4,6-dichloro-1,3-phenylenediamine | Do. |
| 19 | 3-amino-4-carbomethoxybenzoic acid anilide | do | 2-chloro-5-methyl-1,4-phenylenediamine | Greenish yellow. |
| 20 | do | Sarcosine | 2-methyl-5-methoxy-1,4-phenylenediamine | Reddish yellow. |
| 21 | 2,5-dimwthoxy-4-aminobenzenesulphonic acid anilide | Morpholine | do | Do. |
| 22 | do | do | 2,5-dichloro-1,4-phenylenediamine | Greenish yellow. |
| 23 | do | do | 3,3'-dimethyl-4,4'-diaminodiphenyl | Yellow. |
| 24 | 2,5-dimethoxy-4-aminobenzenesulphonic acid diethylamide | do | 2,5-dichloro-1,4-phenylenediamine | Do. |
| 25 | 1-amino-2,4-dimethoxybenzene-5-sulphonic acid anilide | do | do | Greenish yellow. |
| 26 | 4-methyl-3-aminobenzoic acid-2'-chloro-5'-trifluoromethylanilide | Dimethylamine | do | Do. |
| 27 | do | do | 2-methyl-5-chloro-1,4-phenylenediamine | Yellow. |
| 28 | do | do | 2-methoxy-5-chloro-1,4-phenylenediamine | Do. |
| 29 | do | do | 2,5-dimethyl-1,4-phenylenediamine | Reddish yellow. |
| 30 | 4-chloro-3-aminobenzoic acid-2'-phenoxy-5'-trifluoromethylanilide | do | 2-chloro-1,4-phenylenediamine | Greenish yellow. |
| 31 | do | do | 1,4-phenylenediamine | Do. |
| 32 | do | do | 2,5-dichloro-1,4-phenylenediamine | Do. |
| 33 | do | do | 2-chloro-5-methyl-1,4-phenylenediamine | Do. |
| 34 | do | do | 2-chloro-5-methoxy-1,4-phenylenediamine | Do. |
| 35 | do | do | 2,5-dimethyl-1,4-phenylenediamine | Yellow. |
| 36 | 4-chloro-3-aminobenzoic acid-2'(4''-chlorophenoxy)-5'-trifluoromethylanilide | Sarcosine | 1,4-phenylenediamine | Greenish yellow. |
| 37 | do | do | 2-chloro-1,4-phenylenediamine | Do. |
| 38 | do | do | 2,5-dichloro-1,4-phenylenediamine | Do. |
| 39 | do | do | 2-chloro-5-methoxy-1,4-phenylenediamine | Yellow. |
| 40 | do | do | 2-chloro-5-methyl-1,4-phenylenediamine | Do. |
| 41 | 4-chloro-3-aminobenzoic acid-2'-(2'',4''-dichlorophenoxy)-5'-trifluoromethylanilide | do | do | Greenish yellow. |
| 42 | do | do | 2-chloro-5-methoxy-1,4-phenylenediamine | Yellow. |
| 43 | 4-chloro-3-aminobenzoic acid-2'-(2'',4'',5''-trichlorophenoxy)-5'-trifluoromethylanilide | do | do | Greenish yellow. |
| 44 | 4-chloro-3-aminobenzoic acid-2'-chloro-5'-trifluoromethylanilide | Piperidine | 2,5-diamino-1-chlorobenzene | Yellow. |
| 45 | do | Aminoacetic acid | 2,5-diamino-1,4-phenylenediamine | Greenish yellow. |
| 46 | do | Sulphanilic acid | 2,5-diaminobenzene | Do. |
| 47 | 2,5-dimethoxy-4-aminobenzenesulphonic acid-4'-chloranilide | Sarcosine | 2,5-diamino-1-chloro-4-methylbenzene | Do. |
| 48 | 4-chloro-3-aminobenzoic acid-2'-methyl-5'-chloranilide | do | 2,5-diamino-1,4-dimethylbenzene | Do. |
| 49 | 4-chloro-3-aminobenzoic acid-2'-p-chlorophenoxy-5'-trifluoromethylanilide | Piperidine | do | Do. |
| 50 | 4-nitraniline | p-Toluenesulpho-N-ethylamide | 2,5-dichloro-1,4-phenylenediamine | Reddish yellow. |
| 51 | 2-nitro-4-chloraniline | do | do | Do. |
| 52 | 2-chloro-5-methoxyaniline | do | do | Yellow. |
| 53 | 2,5-dimethoxy-5-chloraniline | do | do | Do. |

| No. | I | II | III | IV |
|---|---|---|---|---|
| 54 | 4-methoxy-3-aminobenzenesulphonamide | Diethylamine | 2-chloro-5-methoxy-1,4-phenylenediamine | Greenish yellow. |
| 55 | 4-methoxy-3-aminobenzenesulphone diethylamide | do | do | Do. |
| 56 | 4-methoxy-3-aminobenzenesulphone morpholide | do | do | Do. |
| 57 | 4-methoxy-3-aminobenzenesulphone cyclohexylamide | do | do | Do. |
| 58 | 4-methoxy-3-aminobenzenesulphanilide | do | do | Yellow. |
| 59 | 4-methoxy-3-aminobenzenesulpho-4'-chloranilide | do | do | Do. |
| 60 | 4-methoxy-3-aminobenzenesulpho-2'-chloro-5'-trifluoromethylanilide | do | do | Do. |
| 61 | 4-chloro-3-amino benzoic acid amide | Morpholine | do | Greenish yellow. |
| 62 | 4-chloro-3-aminobenzoic acid-N-methyl-anilide | do | do | Do. |
| 63 | 4-chloro-3-aminobenzoic acid-N-diethyl-amide | do | do | Do. |
| 64 | 4-chloro-3-aminobenzoic acid morpholide | do | do | Do. |
| 65 | 4-methyl-3-aminobenzoic acid amine | do | do | Yellow. |
| 66 | 4-methoxy-3-aminobenzoic acid amide | do | do | Do. |
| 67 | 4-carbomethoxy-3-aminobenzoic acid amide | do | do | Greenish yellow. |
| 68 | 3-aminobenzoic acid amide | do | do | Do. |

EXAMPLE 2

65 parts of stabilized polyvinylchloride, 35 parts of di-octylphthalate and 0.2 part of the dyestuff obtained in paragraph 1 of Example 1 are stirred together and then rolled to and fro for 7 minutes at 140° C. on a two-roll calender. The resulting yellow foil displays very good fastness to light and migration.

We claim:
1. A process for the manufacture of a disazo pigment of the formula

$$R-N=N-CH-CONH-A-NHCOCHN=N-R$$
$$\phantom{R-N=N-}\overset{|}{CH_3CO}\phantom{-CONH-A-NHCO}\overset{|}{COCH_3}$$

in which A represents a radical of the formula

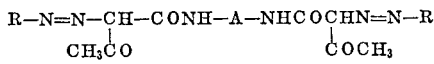

in which $X_1$ and $X_2$ each represents hydrogen, chlorine, lower alkyl or lower alkoxy, $Y_1$ represents hydrogen, chlorine, lower alkyl, lower alkoxy or trifluoromethyl and $Y_2$ represents hydrogen or chlorine and R represents a radical of the formula

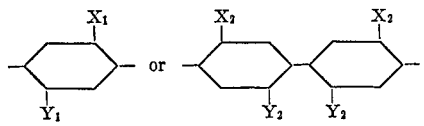

in which $V_1$ represents hydrogen, chlorine, lower alkyl, lower alkoxy or lower carbalkoxy, $V_2$ represents hydrogen or chlorine and X, Y and Z each stands for hydrogen, chlorine, lower alkyl, lower alkoxy or phenoxy, which may be substituted by chlorine, lower alkyl, lower alkoxy, nitro, trifluoromethyl, cyano or lower carbalkoxy, $X_1$ and $Y_1$ each represents hydrogen, chlorine, lower alkyl or lower alkoxy, $R_2$ represents hydrogen or lower alkyl group and $R_3$ represents hydrogen, lower alkyl or phenyl or $R_2$ and $R_3$ together with the nitrogen atom may also form a morpholine ring; wherein a diazoamino compound of the formula

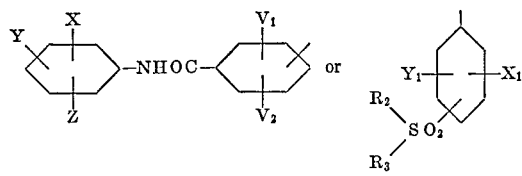

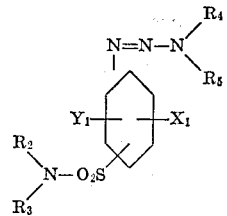

wherein $R_4$ is hydrogen or lower alkyl and $R_5$ is lower alkyl, hydroxyethyl, carboxymethyl, (sulfonic acid)ethyl, carboxyphenyl, sulfophenyl, sulfo-carboxyphenyl, sulfo-phenylformamidino, sulfonaphthyl or cyanoformamidino or $R_4$ and $R_5$ are each cyclohexyl and $R_4$ and $R_5$ together with the nitrogen atom form a piperidine, morpholine or pyrrolidine ring is heated with a compound of the formula $$\begin{array}{ll} CH_2-COHN-A-NH-CO-CH_2 \\ \phantom{CH_2-}\overset{|}{C}=O \phantom{HN-A-NH-CO-}\overset{|}{C}=O \\ \phantom{CH_2-}\overset{|}{CH_3} \phantom{HN-A-NH-CO-}\overset{|}{CH_3} \end{array}$$

at a temperature of between 60–180° in an inert organic solvent.

2. A process according to claim 1 wherein $R_4$ and $R_5$ each represents lower alkyl and $R_4$ and $R_5$ together with the nitrogen atom forms a piperidine, morpholine or pyrrolidine ring.

3. A process as claimed in claim 1, wherein the reaction is carried out in the presence of an acid selected from the group consisting of hydrochloric, sulfuric, formic or acetic acid.

4. A process as claimed in claim 1, wherein acetic acid is used as organic solvent.

References Cited

UNITED STATES PATENTS 2,793,206  5/1957  Scalera et al. ......... 260—203
3,413,279  11/1968  Mueller ............... 260—176

FOREIGN PATENTS 1,213,374  3/1966  Germany ............. 260—140

OTHER REFERENCES

Houben-Weyl, Methoden der Organischen Chemie, 1965, Teil 3, pp. 276–278.

JOSEPH REBOLD, Primary Examiner

D. M. PAPUGA, Assistant Examiner

U.S. Cl. X.R.

260—416, 140, 152, 156, 397.7, 558 A

PO-1050
(5/69)

CASE 6026/E

UNITED STATES PATENT OFFICE
CERTIFICATE OF CORRECTION

Patent No. __3,657,219__      Dated __April 18, 1972__

Inventor(s) __KARL RONCO ET AL__

It is certified that error appears in the above-identified patent and that said Letters Patent are hereby corrected as shown below:

Column 8, lines 20-28, claim 1, the structural formula should be amended to read:

---

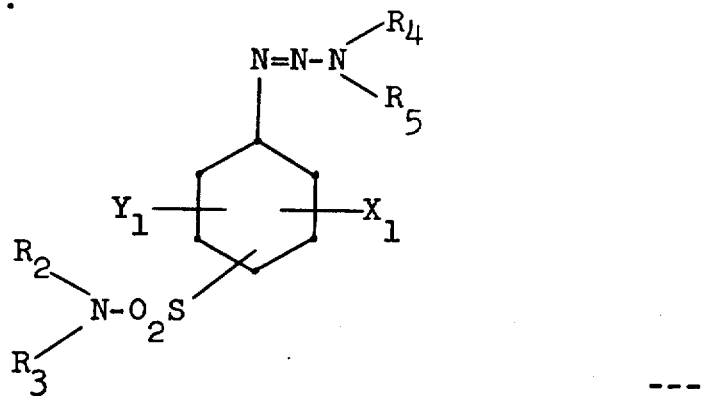

---

Signed and sealed this 15th day of May 1973.

(SEAL)
Attest:

EDWARD M. FLETCHER, JR.
Attesting Officer

ROBERT GOTTSCHALK
Commissioner of Patents

UNITED STATES PATENT OFFICE
CERTIFICATE OF CORRECTION

Patent No. 3,657,219          Dated April 18, 1972

Inventor(s) Karl Ronco et al.

It is certified that error appears in the above-identified patent and that said Letters Patent are hereby corrected as shown below:

Column 1, line 6, delete "Ciba-Limited", and substitute -- CIBA-GEIGY AG --.

Signed and sealed this 7th day of May 1974.

(SEAL)
Attest:

EDWARD M.FLETCHER,JR.          C. MARSHALL DANN
Attesting Officer                Commissioner of Patents